's Patent Office 3,801,644
Patented Apr. 2, 1974

3,801,644
SUBSTITUTED-o-HYDROXY - ω - (METHYLSULFI-
NYL) ACETOPHENONES AND PROCESS FOR
PRODUCING SAME
Maxmilian von Strandtmann, Rockaway, John Shavel,
Jr., Mendham, Sylvester Klutchko, Hackettstown, and
Marvin Cohen, New Milford, N.J., assignors to Warner-
Lambert Company, Morris Plains, N.J.
No Drawing. Filed Aug. 25, 1971, Ser. No. 174,947
Int. Cl. C07c 49/82
U.S. Cl. 260—592      13 Claims

ABSTRACT OF THE DISCLOSURE

The present invention relates to substituted-o-hydroxy-ω-(methylsulfinyl) acetophenones of the Formula I

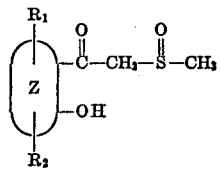

wherein Z is an aromatic or heteroaromatic nucleus such as benzene, naphthalene, anthracene, phenanthrene, pyridine, quinoline, isoquinoline, carbazole, benzothiazine, and the like, wherein $R_1$ is halogen, lower alkoxy, hydroxy, acetamino, alkyl, aralkyl, or aryl; $R_2$ is hydrogen, halogen, hydroxy, alkyl, aralkyl, or aryl; or $R_1$ and $R_2$ taken together may form a 1,3-dioxole ring. The compounds of the present invention are useful as intermediates for the production of chromones which exhibit antiallergenic properties.

---

As used throughout the specification and claims, the term "alkyl" and the "alkyl" portion of "alkoxy" embraces both straight and branched alkyl radicals containing from 1 to 9 carbon atoms, for example, methyl, ethyl, propyl, isopropyl, n-butyl, n-amyl, n-hexyl, 2-ethlybutyl, 2,3-dimethylbutyl and the like. The term halogen encompasses fluorine, bromine, chlorine and iodine. The term "aryl" denotes an aromatic hydrocarbon of 6 to 8 carbon atoms such as phenyl, tolyl and the like. The term "aralkyl" encompasses alkyl groups in which aryl as previously defined is substituted for a hydrogen atom such as for example benzyl, phenyl, ethyl, and the like. The term "acyl" means those hydrocarbon carboxylic acids of less than 12 carbon atoms as exemplified by the lower alkanoic acids, e.g., acetic, propionic, butyric, the aryl carboxylic acids, e.g., benzoic and toluic acid and the like.

The applicants had found in perfecting the process for the production of 3-(hydroxymethyl)chromones that an o-hydroxy-ω-(methylsulfinyl) acetophenone would serve as an intermediate for their production. This process and products are fully set forth in their copending application Ser. No. 112,765, now abandoned. One method of preparing o-hydroxyω-(methylsulfinyl) acetophenone is set forth in the J. Am. Chem. Soc. 85, at page 3413 (1963) as part of an article by Becker et al. The method of preparation described therein dissolves potassium-t-butoxide in DMSO and later reacting the resulting product with methyl salicylate. The yield reported was 18% of theory. The same method could be used to produce a variety of o-hydroxy-ω-(methylsulfinyl) acetophenones depending on the selection of starting reagents. The article concerns itself simply with the chemistry involved and gives no indication that such materials have any specific use.

Applicants in their present invention have determined that the unsubstituted-o-hydroxy-ω-methylsulfinyl acetophenone shown in Becker has no utility for the purposes of the present invention, in that the chromone produced using this compound as an intermediate has no oral antiallergenic activity and further, when administered interperitoneally produces CNS side effects such as convulsions.

It is an object of the present invention to provide an improved method for the production of o-hydroxy-ω-(methylsulfinyl) acetophenones.

It is a further object of the present invention to provide intermediates from which pharmacologically active end compounds may be produced.

Another object of the present invention is to provide a method for the production of o-hydroxy-ω-(methylsulfinyl) acetophenones which is of high efficiency.

The process of the present invention may be stated generally as follows:

Sodium hydride which may be used as a dispersion in mineral oil is added to a mixture of DMSO (dimethyl sulfoxide) in an inert organic solvent. The solvent is chosen on the basis of it being inert to the reactants and its having a suitable boiling point in view of the temperatures at which the desired reaction takes place. For the purpose of the persent invention, benzene is the preferred inert solvent. DMSO and benzene are placed in a reaction vessel and the vessel is then swept with nitrogen. The mixture is agitated by bubbling the nitrogen through it or by mechanical stirring or shaking. Sodium hydride (57% dispersion in mineral oil) may be added all at once or incrementally. The nitrogen atmosphere is maintained above the mixture, the agitation is continued, and the mixture is heated to a temperature in the range of 75° to 80° C. for about ¾ hour to 1 hour. This is the preferred range of temperature which should not be exceeded by much since temperatures much above this may cause decomposition of the sodium methylsulfinylmethide. If too much heat is added to the system, it may become explosive. Temperatures much lower than the preferred range, while operable decrease the reaction rate excessively. When the reaction is complete, the mixture in the vessel is cooled to about 35° C.

The second part of this process is that wherein an aromatic ester having hydroxy group in the ortho position with respect to the carboxyl group is added to the sodium methylsulfinyl methide in the reaction vessel incrementally while stirring or otherwise agitating the mixture. This reaction is exothermic. It is desirable to carry it out at such a rate that the temperature does not rise above 50°. The stirring is continued until such time as the temperature falls to about 25°, which usually is only a matter of about ½ hour. The reaction mixture is then diluted with ether. A precipitate forms which may be filtered out. The precipitate is washed with dry ether and then dissolved in ice water. The solution is filtered and the filtrate acidified with glacial acetic acid. A precipitate is formed.

The unsubstituted o-hydroxy-ω-(methylsulfinyl) acetophenone produced by this method is white, crystalline, has a melting point of 151° to 153° and is produced in a yield of 88% theory as contrasted with a yield of 18% theory following the procedure described by Becker et al.

This compound when used to prepare the corresponding unsubstituted chromone produced a compound which when screened for anti-allergenic properties showed none when administered orally to laboratory rats but did induce disturbances of the CNS such as convulsions when administered intraperitoneally.

The following examples are set forth by way of exemplification and not by way of limitation:

EXAMPLE 1

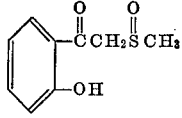

2'-hydroxy-2-(methylsulfinyl)acetophenone

This compound was prepared by reacting, under a stream of nitrogen, a solution of 12.66 g. of NaH (57%) mineral oil dispersion in a mixture of 50 ml. DMSO and 350 ml. of benzene with 16.6 g. of ethyl salicylate. The NaH, DMSO, benzene mixture was heated at 75° to 80° C. for 1 hour then cooled to 35°. Ethyl salicylate was added with stirring over a period of two minutes. The temperature rose to 50°. The stirring was continued for 30 minutes by which time the temperature had fallen to 25°. Ether was added to bring the total volume of the mixture to 2 liters. A precipitate formed and was filtered out, washed with dry ether and dissolved in 150 ml. of ice water. The solution was filtered and the filtrate acidified with 24 g. of glacial acetic acid. The precipitate formed was filtered off, washed with water and recrystallized from absolute ethanol. Product was white, crystalline M.P. 151–153. Yield of 17.5 g. was 88% of theory.

EXAMPLE 2

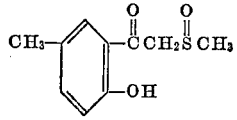

2'-hydroxy-5'-methyl-2-(methylsulfinyl) acetophenone

This compound was prepared by reacting a solution of 44.4 g. of NaH (57%) in a mixture of 600 ml. of DMSO, and 1200 ml. of benzene with 50 g. of methyl 5-methylsalicylate [1] in analogous fashion to 3'-hydroxy-2-(methylsulfinyl)-2'-acetonaphthone. The material was recrystallized from abs. ethanol, M.P. 132.5–35°; yield 44 g. (70%).

*Analysis.*—Calcd. for $C_{10}H_{12}O_3S$ (percent): C, 56.58; H, 5.70; S, 15.11. Found (percent): C, 56.77; H, 5.79; S, 15.03.

EXAMPLE 3

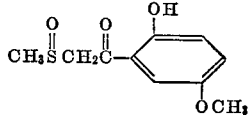

2'-hydroxy-5'-methoxy-2-(methylsulfinyl)acetophenone

This was prepared by reacting a solution of 4.4 g. of NaH (57% oil dispersion) in a mixture of 120 ml. of benzene, and 60 ml. of DMSO with 5.5 g. of methyl 5-methoxy-salicylate [2] in analogous fashion to 3'-hydroxy-2-(methylsulfinyl)-2'-acetonaphthone. The material was recrystallized from abs. ethanol, M.P. 153–55.5°; yield 4 g. (58%).

*Analysis.*—Calcd. for $C_{10}H_{12}O_4S$ (percent): C, 52.62; H, 5.30; S, 14.05. Found (percent): C, 52.73; H, 5.42; S, 13.82.

EXAMPLE 4

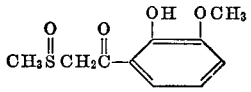

2'-hydroxy-3'-methoxy-2-(methylsulfinyl)acetophenone

This material was prepared by reacting a solution of 44 g. of NaH (57% oil dispersion) in a mixture of 1200 ml. of benzene, and 600 ml. of DMSO with 55 g. of methyl 3-methoxysalicylate [3] in analogous fashion to 3'-hydroxy-2-(methylsulfinyl)-2'-acetonaphthone. The material was recrystallized from abs. ethanol, M.P. 140.5–43.5°; yield 46 g. (67%).

*Analysis.*—Calcd. for $C_{10}H_{12}O_4S$ (percent): C, 52.62; H, 5.30; S, 14.05. Found (percent): C, 52.88; N, 5.26; S, 14.27.

EXAMPLE 5

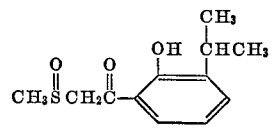

2'-hydroxy-3'-isopropyl-2-(methylsulfinyl)acetophenone

This was prepared by reacting a solution of 44 g. of NaH in a mixture of 600 ml. of benzene and 300 ml. of DMSO with 58.2 g. of methyl 3-isopropylsalicylate [4] in analogous fashion to 3'-hydroxy-2-(methylsulfinyl) - 2' - acetonaphthone.

The material was recrystallized from Skelly B, M.P. 111–140°; yield 27 g. (37.5%).

*Analysis.*—Calcd. for $C_{12}H_{16}O_3S$ (percent): C, 59.97; H, 6.71; S, 13.34. Found (percent): C, 59.75; H, 6.74; S, 13.31.

EXAMPLE 5A

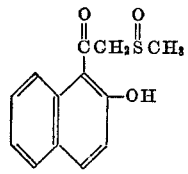

2'-hydroxy-2-(methylsulfinyl)-1'-acetonaphthone

This was prepared in analogous fashion to 3'-hydroxy-2-(methylsulfinyl)-2'-acetonaphthone, by reacting a solution of 4.4 g. of NaH (57% oil dispersion) in a mixture of 60 ml. of DMSO and 120 ml. of benzene with 6.48 g. of ethyl 2-hydroxyl-1-naphthoate [I. M. Hausberger, J.A.C.S., 72, 5634 (1950)]. The material was recrystallized from abs. ethanol, M.P. 145–47.5°; yield 3.5 g. (49%).

*Analysis.*—Calcd. for $C_{13}H_{12}O_3S$ (percent): C, 62.88; H, 4.87; S, 12.91. Found (percent): C, 62.81; H, 4.87; S, 12.98.

EXAMPLE 6

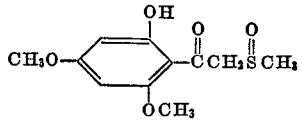

2'-hydroxy-4',6'-dimethoxy-2-(methylsulfinyl) acetophenone

This compound was prepared by reacting a solution of 42.2 g. of NaH (57%) in a mixture of 570 ml. of DMSO, ---
[1] Heilbron, Dictionary of Organic Cmpds., 4th ed., vol. 3, p. 1816.
[2] Beilstein, 10, 386.
[3] Beilstein, 10, 386.
[4] The ester was prepared by Fisher esterification of the acid (Beilstein, 10, 271) in anhydrous $CH_3OH$ in presence of dry HCl.

and 1.14 l. of benzene with 57 g. of methyl 4,6-dimethoxysalicylate (Helv. Chim. Acta., 45, 2241 (1962)) in analogous fashion to 3'-hydroxy-2-(methylsulfinyl)-2'-acetonaphthone. The material was recrystallized from abs. ethanol, M.P. 108.5–10.5°; yield 55 g. (78%).

Analysis.—Calcd. for $C_{11}H_{14}O_5S$ (percent): C, 51.15; H, 5.46; S, 12.41. Found (percent): C, 51.15; H, 5.50; S, 12.21.

EXAMPLE 7

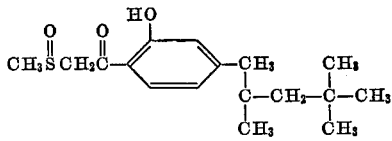

2'-hydroxy-2-(methylsulfinyl)-5'-(1,1,3,3-tetramethylbutyl) acetophenone

This compound was prepared by reacting a solution of 36 g. of NaH (57%) in a mixture of 480 ml. of DMSO, and 960 ml. of benzene with 64 g. of methyl 5-(1,1,3,3-tetramethylbutyl)salicylate (prepared by esterification of 5-(1,1,3,3-tetramethylbutyl)salicylic acid, Aldrich Chem. Co.) in analogous fashion to 3'-hydroxy-2-(methylsulfinyl)-2'-acetonaphthone. The material was recrystallized from $CH_3CN$, M.P. 99–101°; yield 20 g. (27%).

Analysis.—Calcd. for $C_{17}H_{26}O_3S$ (percent): C, 65.77; H, 8.44; S, 10.33. Found (percent): C, 66.06; H, 8.48; S, 10.58.

EXAMPLE 8

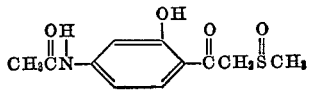

3'-hydroxy-4'-[(methylsulfinyl)acetyl]acetanilide

This was prepared by reacting a solution of 35 g. of NaH (57% oil suspension) in a mixture of 1 l. of benzene, and 500 ml. of DMSO with 50 g. of methyl 4-acetamidosalicylate [5] in analogous fashion to 3'-hydroxy-2-(methylsulfinyl)-2'-acetonaphthone.

The material was recrystallized from abs. ethanol, M.P. 193–96°; yield 24 g. (40%).

Analysis.—Calcd. for $C_{11}H_{13}NO_4S$ (percent): C, 51.75; H, 5.13; N, 5.49; S, 12.56.

EXAMPLE 9

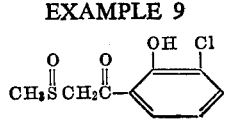

3'-chloro-2'-hydroxy-2-(methylsulfinyl)acetophenone

This was prepared by reacting a solution of 4.4 g. of NaH (57%) in a mixture of 60 ml. of DMSO and 120 ml. of benzene with 5.6 g. of methyl 3-chlorosalicylate (Ber., 61, 2565 (1928), Reissert & Cramer) in analogous fashion to 3'-hydroxy-2-(methylsulfinyl) - 2' - acetonaphthone. The material was recrystallized from abs. ethanol, M.P. 121–23.5°; yield 4 g. (57%).

Analysis.—Calcd. for $C_9H_9ClO_3S$ (percent): C, 46.46; H, 3.90; S, 13.78. Found (percent): C, 46.39; H, 3.87; S, 13.74.

EXAMPLE 10

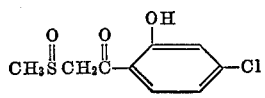

4'-chloro-2'-hydroxy-2-(methylsulfinyl)acetophenone

This material was prepared by reacting a solution of 4.4 g. of NaH (57% oil dispersion) in a mixture of 60 ml. of DMSO, and 120 ml. of benzene with 5.6 g. of methyl 4-chlorosalicylate [6] in analogous fashion to 3'-hydroxy - 2 - (methylsulfinyl)-2'-acetonaphthone. The material was recrystallized from abs. ethanol, M.P. 142–44°; yield 3 g. (43%).

Analysis.—Calcd. for $C_9H_9ClO_3S$ (percent): C, 46.46; H, 3.90; S, 13.78. Found (percent): C, 46.22; H, 3.81; S, 13.71.

EXAMPLE 11

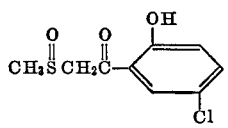

5'-chloro-2'-hydroxy-2-(methylsulfinyl)acetophenone

This was prepared by reacting a solution of 4.4 g. of NaH (57% oil dispersion) in a mixture of 120 ml. of benzene and 60 ml. of DMSO with 5.6 g. of methyl 5-chlorosalicylate [7] in analogous fashion to 3'-hydroxy-2-(methylsulfinyl)-2'-acetonaphthone. The material was recrystallized from abs. ethanol, M.P. 144–47°; yield 4.5 g. (64%).

Analysis.—Calcd. for $C_9H_9ClO_3S$ (percent): C, 46.46; H, 3.90; S, 13.78. Found (percent): C, 46.69; H, 3.85; S, 13.68.

EXAMPLE 12

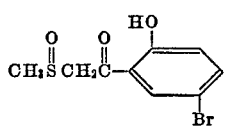

5'-bromo-2'-hydroxy-2-(methylsulfinyl) acetophenone

This was prepared by reacting a solution of 4.4 g. of NaH in a mixture of 60 ml. of DMSO and 120 ml. of benzene with 6.93 g. of methyl 5-bromosalicylate [8] in analogous fashion to 3' - hydroxy-2-(methylsulfinyl)-2'-acetonaphthone. The material was recrystallized from abs. ethanol, M.P. 148–149°; yield 5 g. (60%).

Analysis.—Calcd. for $C_9H_9BrO_3S$ (percent): C, 39.01; H, 3.27; S, 11.57. Found (percent): C, 39.26; H, 3.36; S, 11.64.

EXAMPLE 13

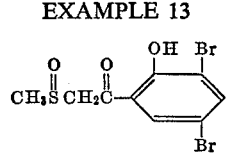

3',5'-dibromo-2'-hydroxy-2-(methylsulfinyl) acetophenone

This was prepared by reacting a solution of 4.4 g. of NaH (50% oil dispersion) in a mixture of 120 ml. of benzene, and 60 ml. of DMSO with 9.27 g. of methyl 3,5-dibromosalicylate [9] in analogous fashion to 3'-hydroxy-2-(methylsulfinyl)-2'-acetonaphthone. The material was recrystallized from abs. ethanol, M.P. 154–54.5°; yield 3 g. (28%).

Analysis.—Calcd. for $C_9H_8Br_2O_3S$ (percent): C, 30.36; H, 2.26; Br, 44.89; S, 9.01. Found (percent): C, 30.23; H, 2.32; Br, 44.65; S, 9.26.

---

[5] Arzeneimittel Forschung, 12, 485 (1962).
[6] French Pat. M1973.
[7] Beilstein 10, 103.
[8] Aldrich Chem. Co., Milwaukee, Wis.
[9] Beilstein, 10, 110.

EXAMPLE 14

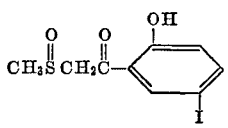

2'-hydroxy-5'-iodo-2-(methylsulfinyl) acetophenone

This was prepared by reacting a solution of 4.4 g. of NaH (57% oil dispersion) in a mixture of 120 ml. of benzene and 60 ml. of DMSO with 8.34 g. of methyl 5-iodosalicylate [10] in analogous fashion to 3'-hydroxy-2-(methylsulfinyl)-2'-acetonaphthone. The material was recrystallized from abs. ethanol, M.P. 143.5–45°; yield 5.5 g. (56%).

Analysis.—Calcd. for $C_9H_9IO_3S$ (percent): C, 33.35; H, 2.80; S, 9.89. Found (percent): C, 33.51; H, 2.79; S, 10.14.

EXAMPLE 15

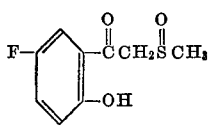

5'-fluoro-2'-hydroxy-2-(methylsulfinyl) acetophenone

This compound was prepared by reacting a solution of 31 g. of NaH (57%) in a mixture of 425 ml. of DMSO and 850 ml. of benzene with 36 g. of methyl 5-fluorosalicylate (Chem. Abstr., 63 16255(b) in analogous fashion to 3'-hydroxy-2-(methylsulfinyl)-2'-acetonaphthone. The material was recrystallized from methanol, M.P. 154–57°; yield 30 g. (67%).

Analysis.—Calcd. for $C_9H_9FO_3S$ (percent): C, 49.99; H, 4.20; S, 14.83. Found (percent): C, 49.89; H, 4.23; S, 15.07.

EXAMPLE 16

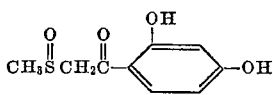

2',4'-dihydroxy-2-(methylsulfinyl) acetophenone

This was prepared by reacting a solution of 44 g. of NaH (57% oil dispersion) in a mixture of 1200 ml. of benzene, and 600 ml. of DMSO with 50 g. of methyl 2,4-dihydroxybenzoate [11] in analogous fashion to 3-hydroxy-2 - (methylsulfinyl)-2'-acetonaphthone. The material was recrystallized from abs. ethanol, M.P. 174–76°; yield 18 g. (28%).

Analysis.—Calcd. for $C_9H_{10}O_4S$ (percent): C, 50.46; H, 4.70; S, 14.97. Found (percent): C, 50.57; H, 4.71; S, 14.81.

EXAMPLE 17

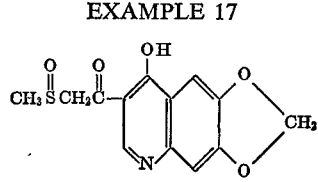

8-hydroxy-1,3-dioxolo[4,5-g]quinolin-7-yl(methylsulfinyl)methyl ketone

This was prepared by reacting a solution of 27.5 g. of NaH (57%) in a mixture of 360 ml. of DMSO and 720 ml. of benzene with 47 g. of ethyl 4-hydroxy-6,7-methylenedioxyquinoline-3-carboxylate [12] in analogous fashion to 3'-hydroxy-2-(methylsulfinyl)-2'-acetonaphthone. The material was recrystallized from DMF, M.P. 201.5–203°; yield 38 g. (71%).

Analysis.—Calcd. for $C_{13}H_{11}NO_5S$ (percent): C, 53.24; H, 3.78; S, 10.93. Found (percent): C, 53.51; H, 3.89; S, 10.80.

EXAMPLE 18

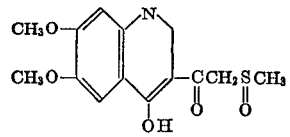

4-hydroxy-6,7-dimethoxy-3-quinolyl(methylsulfinyl) methyl ketone

This was prepared by reacting 25.5 g. of 4-hydroxy-6,7-dimethoxy quinoline-3-carboxylate [13] with a solution of 13.2 g. of NaH in 360 ml. of benzene and 180 ml. of DMSO in analogous fashion to 3'-hydroxy-2-(methylsulfinyl-2'-acetonaphtone. The compound was recrystallized from DMF, M.P. 223.5–25.5°; yield 17 g. (60%).

Analysis.—Calcd. for $C_{14}H_{15}NO_5S$ (percent): C, 54.36; H, 4.89; N, 4.53; S, 10.37. Found (percent): C, 54.14; H, 4.97; N, 4.71; S, 10.34.

EXAMPLE 19

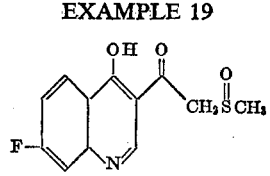

7-fluoro-4-hydroxy-3-quinolyl (methylsulfinyl) methyl ketone (W7655)

A mixture of dimethylsulfoxide (120 ml.), benzene (200 ml.), and 57% sodium hydride mineral oil dispersion (6.2 g., 0.15 mole) was heated at 75° to 80° with stirring under nitrogen until all the solid had dissolved to give a green solution.

Ethyl-4-hydroxy-7-fluoro - 3 - quinoline carboxylate [14] (11.75 g., 0.05 mole) was added to the ice cold solution of the dimethylsulfoxide anion with vigorous stirring. The reaction mixture was stirred at room temperature for one hour and poured into a large excess of ether. The yellow insoluble sodium salts were filtered, washed with ether, and dissolved in water. Acidification with acetic acid gave a pink crystalline solid. No further material was obtained by extraction with ethyl acetate. Recrystallization from absolute ethanol gave pure 7-fluoro-4-hydroxy-3-quinolyl (methylsulfinyl)-methyl ketone as pink crystals. M.P. 202–204; yield, 4.81 g. (36%).

Analysis.—Calcd. for $C_{12}H_{10}FNO_3S$ (percent): C, 53.93; H, 3.77; N, 5.24; S, 12.00. Found (percent): C, 53.65; H, 3.78; N, 5.31; S, 12.17.

EXAMPLE 20

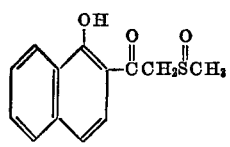

1'-hydroxy-2-(methylsulfinyl)-2'-acetonaphthone

This was prepared by reacting a solution of 11 g. of NaH in a mixture of 300 ml. of benzene and 150 ml. of DMSO with 15 g. of ethyl 1-hydroxy-2-naphthoate [15] in analogous fashion to 3'-hydroxy-2-(methylsulfinyl)-2'-acetonaphthone. The material was recrystallized from

---

[10] Ann. Chim. (Rome), 57, 607–15 (1967).
[11] Aldrich Chem. Co.
[12] U.S.P. 3,287,458.
[13] J. Am. Chem. Soc., 68, 1264 (1946).
[14] J. Am. Chem. Soc., 69, 371, 374 (1947).
[15] Ber., 20, 2700 (1887).

ethylacetate with the aid of charcoal, M.P. 138–40°; yield 12.5 g. (64%).

*Analysis.*—Calcd. for $C_{13}H_{12}O_3S$ (percent): C, 62.88; H, 4.87; S, 12.91. Found (percent): C, 63.18; H, 4.91; S, 13.10.

EXAMPLE 21

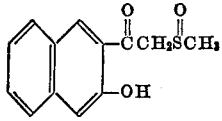

3'-hydroxy-2-(methylsulfinyl)-2'-acetonaphthone

To a mixture of 100 ml. of benzene, and 60 ml. dimethylsulfoxide was added 4.4 g. of NaH. The mixture was heated with stirring under a stream of nitrogen on a water bath at ca. 75° for 45 min. The clear solution was cooled to ca. 25° in an ice-bath, the bath removed, and 5.8 g. of ethyl 3-hydroxynaphthoate [16] was added with stirring. The temp. rose to 40°. The solution was stirred until the temp. dropped to 25° (45 min.) and was then diluted to 500 ml. with anhyd. ether. The precipitate was filtered off, washed with anhyd. ether, and dissolved in 30 ml. of $H_2O$. The aqueous solution was then adjusted to ca. pH 6 in the cold with glacial acetic acid. The precipitate was filtered off, washed with $H_2O$, and recrystallized from abs. ethanol, M.P. 190–93°; yield 3.5 g. (46%).

*Analysis.*—Calcd. for $C_{13}H_{12}O_3S$ (percent): C, 62.88; H, 4.87; S, 12.91. Found (percent): C, 63.10; H, 4.84; S, 12.96.

EXAMPLE 22

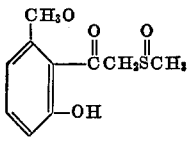

2'-hydroxy-6'-methoxy-2-(methylsulfinyl) acetophenone

This was prepared by reacting a solution of 4.4 g. of NaH in a mixture of 60 ml. of DMSO, and 120 ml. of benzene with 10 g. of methyl 6-hydroxy-o-anisate (J. Chem. Soc., 1962, 1457, J. Soulal et al.) in analogous fashion to 3'-hydroxy-2-(methylsulfinyl)-2'-acetonaphthone. The material was recrystalized from abs. ethanol, M.P. 123–25°; yield 4 g. (57%).

*Analysis.*—Calcd. for $C_{10}H_{12}O_4S$ (percent): C, 52.62; H, 5.30; S, 14.05. Found (percent): C, 53.05; H, 5.33; S, 13.96.

EXAMPLE 23

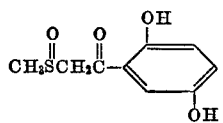

2'-5'-dihydroxy-2-(methylsulfinyl) acetophenone

This was prepared by reacting a solution of 28 g. of NaH (57% oil dispersion) in a mixture of 600 ml. of benzene, and 300 ml. of DMSO with 32 g. of methyl gentisate [17] in analogous fashion to 3-'hydroxy-2-(methylsulfinyl)-2'-acetonaphthone. The material was recrystallized from abs. ethanol with the aid of charcoal, M.P. 174–75°; yield 8 g. (20%).

---
[16] Ber. 25, 3635.
[17] Eastman Kodak Co., Rochester, N.Y.

*Analysis.*—Calcd. for $C_9H_{10}O_4S$ (percent): C, 50.46; H, 4.70; S, 14.97. Found (percent): C, 50.49; H, 4.80; S, 15.07.

EXAMPLE 24

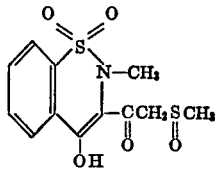

4-hydroxy-2-methyl-2H-1,2-benzothiazin-3-yl (methylsulfinyl)methyl ketone-S,S-dioxide This was prepared by reacting 64.8 g. of ethyl-4-hydroxy-2H-,1-benzothiazin - 3 - carboxylate 1,1 dioxide [18] with 35 g. of NaH (57% suspension in mineral oil) in a mixture of 960 ml. of benzene and 480 ml. of DMSO in analogous fashion to 3'-hydroxy-2-(methylsulfinyl)-2'-acetophenone.

The material was recrystallized from $CH_3CN$, M.P. 160–161° C. Yield 47 g. (62% of theory).

*Analysis.*—Calcd. for $C_{12}H_{13}NO_5S_2$ (percent): C, 45.70; H, 4.16; N, 4.44; S, 20.33. Found (percent): C, 45.79; H, 3.97; N. 4.29; S, 20.05.

EXAMPLE 25

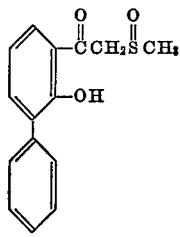

2'-hydroxy-2-(methylsulfiny)-3'-phenyl acetophenone

This was prepared by reacting a solution of 4.4 g. of NaH (57% suspension in mineral oil) in a mixture of 60 ml. of dimethyl sulfoxide and 120 ml. of benzene with 6.85 g. of methyl-3-phenylsalicyclate [19] in analogous fashion to 3'-hydroxy-2-(methylsulfinyl)-2'-acetophenone.

The material was crystallized from absolute ethanol M.P. 126–128°.

*Analysis.*—Calcd. for $C_{15}H_{14}O_3S$ (percent): C, 65.67; H, 5.14; S, 11.69. Found (percent): C, 65.80; H, 5.09; S, 11.81.

---
[18] U.S. Pat. 3,501,466.
[19] Sahyun et al., J.A. Pa. A. Sci. Ed. 45, 277–281 (1956).

Having described our invention, what we desire to secure by Letters Patent is:

1. A compound of the formula:

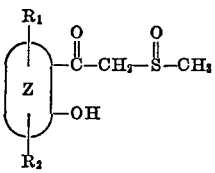

wherein Z is a benzene or naphthalene ring system; $R_1$ is an alkoxyl group having 1 to 6 carbon atoms in the alkyl residue and $R_2$ is hydrogen, an alkyl group having 3 to 9 carbon atoms, a phenyl group, an alkoxyl group having 1 to 6 carbon atoms in the alkyl residue and a hydroxyl group, and when Z is a benzene ring system, $R_2$ is at least one group other than hydrogen.

2. A compound according to claim 1 which is 2'-hydroxy-5'-methoxy-2-(methylsulfinyl)acetophenone.

3. A compound according to claim 1 which is 2'-hydroxy-3'-methoxy-2-(methylsulfinyl)acetophenone.

4. A compound according to claim 1 which is 2'-hydroxy-3'-isopropyl-2-(methylsulfinyl)acetophenone.

5. A compound according to claim 1 which is 2'-hydroxy-2-(methylsulfinyl)-1'-acetonaphthone.

6. A compound according to claim 1 which is 2'-hydroxy-4',6'-dimethoxy-2-(methylsulfinyl)acetophenone.

7. A compound according to claim 1 which is 2'-hydroxy - 2-(methylsulfinyl)-5'-(1,1,3,3, - tetramethylbutyl) acetophenone.

8. A compound according to claim 1 which is 2',4'-dihydroxy-2-(methylsulfinyl)acetophenone.

9. A compound according to claim 1 which is 1'-hydroxy-2-(methylsulfinyl)-2'-acetonaphthone.

10. A compound according to claim 1 which is 3'-hydroxy-2-(methylsulfinyl)-2'-acetonaphthone.

11. A compound according to claim 1 which is 2'-hydroxy-6'-methoxy-2-(methylsulfinyl)acetophenone.

12. A compound according to claim 1 which is 2'-5'-dihydroxy-2-(methylsulfinyl)acetophenone.

13. A compound according to claim 1 which is 2'-hydroxy-2-(methylsulfinyl)-3'-phenyl acetophenone.

References Cited

Russell et al., Chem. Abstracts 68: 29429m (1968).
Lyness et al., Chem. Abstracts 68: 39121n (1968).

DANIEL D. HORWITZ, Primary Examiner

U.S. Cl. X.R.

260—243 R, 283 S, 289 R, 293.89, 315, 340.5, 562 R